United States Patent [19]

Larkin et al.

[11] 4,411,491
[45] Oct. 25, 1983

[54] CONNECTOR ASSEMBLY WITH ELASTOMERIC SEALING MEMBRANES HAVING SLITS

[75] Inventors: Joseph F. Larkin, Holland; Malcolm H. Hodge, Wyncote, both of Pa.

[73] Assignee: TRW Inc., Redondo Beach, Calif.

[21] Appl. No.: 301,113

[22] Filed: Sep. 10, 1981

[51] Int. Cl.³ .............................................. G02B 7/26
[52] U.S. Cl. .............................. 350/96.21; 350/96.20
[58] Field of Search ............... 350/96.20, 96.21, 96.22; 339/36, 40, 42, 60 R, 61 R, 94 R

[56] References Cited

U.S. PATENT DOCUMENTS

| | | | |
|---|---|---|---|
| 1,933,592 | 11/1933 | Hubbell, Jr. | 173/332 |
| 2,279,516 | 4/1942 | O'Brien | 173/334.1 |
| 2,619,515 | 11/1952 | Doane | 173/328 |
| 3,201,740 | 8/1965 | Rubens | 339/40 |
| 3,519,975 | 7/1970 | Prow, Jr. et al. | 339/14 |
| 3,571,779 | 3/1971 | Collier | 339/18 |
| 3,643,207 | 2/1972 | Cairns | 339/96 |
| 3,784,959 | 1/1974 | Horton | 339/60 M |
| 3,810,070 | 5/1974 | Ludwig | 339/36 |
| 3,845,234 | 10/1974 | Brenner | 174/67 |
| 4,109,989 | 8/1978 | Snyder et al. | 339/94 M |
| 4,162,119 | 7/1979 | Goodman | 350/96.21 |
| 4,225,214 | 9/1980 | Hodge et al. | 350/96.21 |
| 4,277,135 | 7/1981 | Schrott et al. | 350/96.21 |

FOREIGN PATENT DOCUMENTS 2734522  2/1979  Fed. Rep. of Germany ... 350/96.21

*Primary Examiner*—John D. Lee
*Attorney, Agent, or Firm*—Lawrence S. Cohen; Robert W. Keller; Henry H. Skillman

[57] ABSTRACT

A connector for interconnecting two conductors comprises a plug component for mating engagement with a receptacle component. The plug component has a conductor means therein and a first elastomeric sealing membrane covering the mating end thereof to seal the same, the sealing membrane having a slit therein. The receptacle component includes conductor receiving means therein and a second elastomeric sealing membrane covering the mating end thereof to seal the same. The second sealing membrane also has a slit therein, the slits in each of the sealing membranes being positioned to register upon mating engagement of the plug and receptacle components. The connector further includes displacement means operable upon the mating engagement of the plug and receptacle components to stretch the first and second sealing membranes in a direction transverse to the slits to open the slits to permit the passage of the conductor means therethrough during engagement and disengagement of the components. The displacement means is also operable upon disengagement of the components to relax the first and second sealing membranes to close the slits.

23 Claims, 22 Drawing Figures

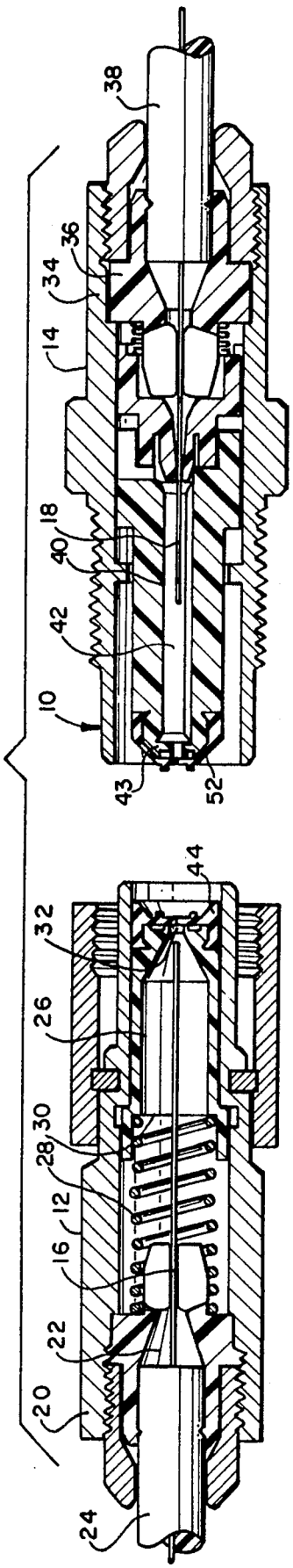
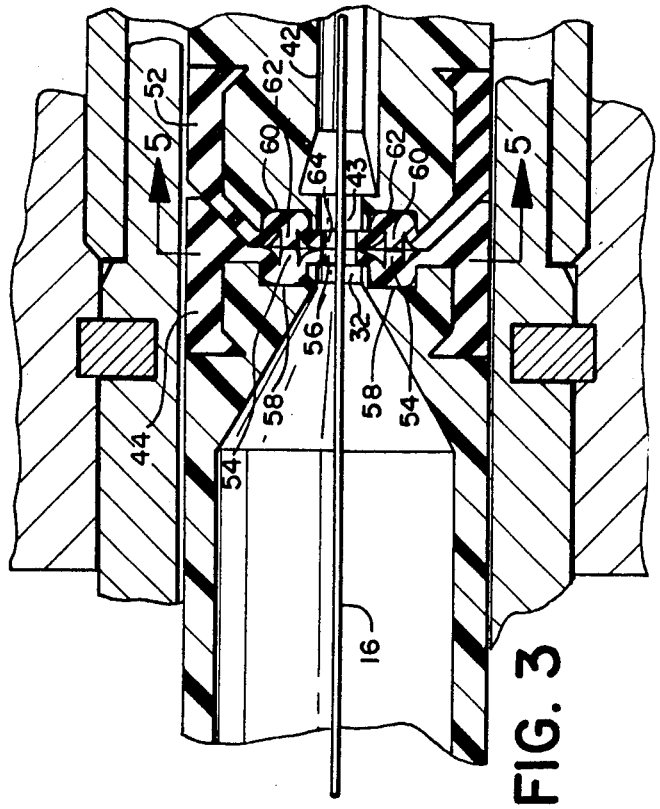
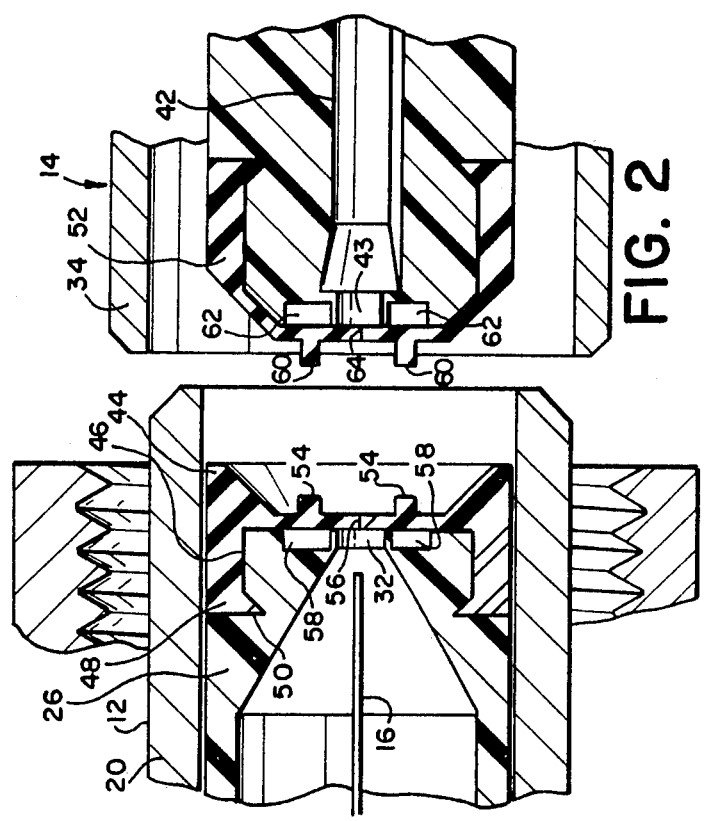
FIG. 1
FIG. 2
FIG. 3

CONNECTOR ASSEMBLY WITH ELASTOMERIC SEALING MEMBRANES HAVING SLITS

BACKGROUND OF THE INVENTION

This invention relates to a connector assembly for interconnecting two conductors and, more particularly, to such a connector assembly having sealing membranes covering the mating ends of the connecting components to enclose and protect the interiors thereof.

The contacts or conductors in many connectors in use today are highly susceptible to contamination by moisture, dust, dirt and other atmospheric borne related contaminants. Particularly susceptible to such contamination are micro-miniature connectors wherein the mating contacts are extremely small and fiber optical connectors, such as the Optalign TM connector described and claimed in U.S. Pat. No. 4,225,214 and assigned to TRW Inc., the assignee of the present invention, in which the abutting conductors or fibers are extremely small. In addition, as a proposed modification to the Optalign TM connector described in the aforesaid U.S. patent, the abutting fiber ends are coated with a liquid to obtain a more even joint upon coupling of the connector components. The use of such a liquid on the fiber ends makes the connector and its fibers extremely susceptible to contamination from particles of dust, dirt and the like because the liquid tends to attract and retain such particles, thereby decreasing the effectiveness of the optical connection and the entire optical circuit.

Many prior art connectors have been developed to provide a tight seal which is effective in preventing such contamination when the two connector components are connected together. While it is desirable to maintain such a tight sealing relationship between the connector components, such an arrangement has been found to be ineffective in protecting the exposed conductors or contacts from contamination during the times when the connector components are not interconnected.

Other prior art connector assemblies have included tightly fitting plugs or caps which snap on or screw over the mating ends of each of the unconnected connector components to provide a tight seal against contamination of the conductor or contact within the connector components. While such plugs or caps are effective in protecting the conductors or contacts from contamination when the connector components are not interconnected, they make interconnection of the connector components somewhat cumbersome in that they generally cannot be removed with one hand, thereby necessitating the separate removal of the plug or cap from each component prior to interconnection; at least a three-step process. In addition, once they are removed from the connector components, such plugs or caps are susceptible to being lost or misplaced so as to not be readily available for replacement over the ends of the connector components whenever the components are disengaged. Moreover, even if they are readily available, due to the inherent multi-step process involved in removing and replacing the plugs or caps, they are not always properly employed by service and user personnel in the field during the time that the connector components are uncoupled.

In an effort to overcome the inherent disadvantages of the plug or cap connector component sealing methods, some prior art electrical connector manufacturers and others have permanently installed a thin flexible sealing membrane or diaphragm over the mating end of each of the connector components. While the connector components are uncoupled, this diaphragm effectively protects the contacts or conductors within the connector components from contamination from dust, dirt, moisture and the like. Upon the interconnection of the two components, a contact pin passes through the diaphragms or through registered slots in the diaphragms to complete the connection. Upon disengagement of the connector components, the contact pin is withdrawn, the diaphragms or slots again automatically sealing the ends of the connector components to protect against contamination of the contacts. Once example of such a diaphragm-covered connector assembly is disclosed in U.S. Pat. No. 4,109,989 entitled "Environmentally Sealed Electrical Connector".

While the diaphragm covered connector of the type disclosed in the aforesaid U.S. Pat. No. 4,109,989 provides relatively effective automatic contamination protection without the use of extraneous plugs or caps and is relatively simple to operate, it is not suitable for employment in all connector applications. For example, in a micro-miniature electrical connector assembly, the contact pin may be so small that the operation of passing the pin through such a diaphragm, or even through tightly closed slots in such a diaphragm, would damage the contact pin, thereby rendering the connector assembly unserviceable. Likewise, in a fiber optical connector, such as the aforementioned Optalign TM connector, the conducting optical fibers are too small and brittle to pass through even a thin diaphragm (or slots therein) without resulting in detrimental effects upon the fibers.

The present invention, which is particularly suitable for fiber optical connections, overcomes the deficiencies of the prior art diaphragm-sealed connector assemblies by providing a connector assembly wherein the mating ends of the components are covered with elastomeric sealing membranes having slits therein and having displacement means to automatically stretch the membranes to open the slits to permit passage of the conductor therethrough during engagement and disengagement of the connector components.

SUMMARY OF THE INVENTION

Briefly stated, the present invention comprises a connector for interconnecting two conductors, for example, the ends of two optical fibers, comprising a plug component for mating engagement with a receptacle component. The plug component has conductor means therein and a first elastomeric sealing membrane covering the mating end thereof to seal the same, the first sealing membrane having a slit therein. The receptacle component has conductor receiving means therein and a second elastomeric sealing membrane covering the mating end thereof to seal the same. The second sealing membrane also has a slit therein, the slits in each of the sealing membranes being positioned to register upon mating engagement of the plug and receptacle components. The connector further includes displacement means operable upon the mating engagement of the plug and receptacle components to stretch the first and second sealing membranes in a direction transverse to the slits to open the slits to permit the passage of the conductor means therethrough during engagement and disengagement of the components. The displacement means is also operable upon disengagement of the plug and receptacle components to relax the first and second sealing membranes to close the slits.

BRIEF DESCRIPTION OF THE DRAWINGS

The foregoing summary, as well as the following detailed description of a preferred embodiment and several alternate embodiments of the present invention, will be better understood when read in conjunction with the accompanying drawings, in which:

FIG. 1 is a slightly enlarged sectional view of the uncoupled plug and receptacle components of a connector constructed in accordance with the preferred embodiment of the present invention;

FIG. 2 is a greatly enlarged view of a portion of FIG. 1 showing in greater detail the mating ends of the uncoupled plug and receptacle components immediately prior to coupling;

FIG. 3 is a greatly enlarged view of the plug and receptacle components of FIG. 1 in the assembled interlocked or coupled position;

DESCRIPTION OF A PREFERRED EMBODIMENT

Figure 5:
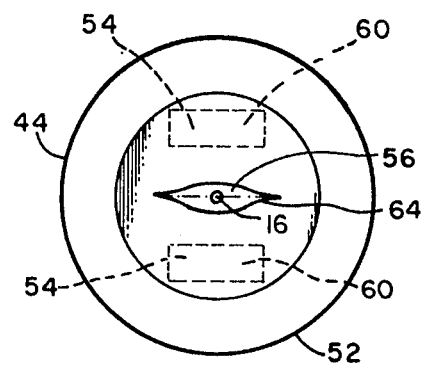
FIG. 5 is a view of the sealing membrane portion of FIG. 3 taken along the line 5—5 to show the sealing membrane in the open position.

Referring to the drawings, and particularly to FIG. 1, there is shown, in accordance with the present invention, a connector assembly or connector (shown generally as 10) for connecting together the ends of two optical fibers. Although the preferred embodiment of the invention, as hereinafter set forth, relates to an optical fiber connector assembly, it will be appreciated and should be understood that the present invention is not limited to such an optical fiber connector, but includes other types of connectors such as electrical connectors and microwave connectors.

The structure and operation of the connector assembly 10 is substantially similar to the Optalign TM connector assembly as described and claimed in the aforementioned U.S. Pat. No. 4,225,214, the disclosure and drawings of which are incorporated herein by reference. A full description of the detailed structure and operation of the Optalign TM fiber optic connector assembly is not believed to be necessary for a complete understanding of the present invention since the referenced patent may be referred to for such details. Briefly, however, the connector assembly 10 is comprised of two major components: a plug component 12 and a receptacle component 14, the two components being adapted to engage one another in telescoping interlocking relationship for the purpose of registering, connecting or abutting the ends of two optical fibers 16 and 18, respectively contained therein, to form a low-loss optical connection or joint. The plug component 12 includes a generally cylindrical housing 20 adapted to receive a fiber clamping means, for example cable clamp 22, for receiving and retaining a fiber optic cable 24 and the encompassed optical fiber 16 against axial displacement within the cylindrical housing 20. Before being inserted into the clamp 22, the optical fiber 16 is severed or cut to a precise predetermined length so as to extend a predetermined axial distance beyond the inner end of the clamp 22 within an encompassing protective piston 26. An apparatus for severing optical fibers to the precise lengths required for use in both the plug component 12 and the receptacle component 14 is described and claimed in U.S. Pat. No. 4,274,572 entitled "Apparatus for Severing an Optical Fiber" which is assigned to TRW Inc., the assignee of the present invention.

The piston 26 is reciprocally movable within the plug housing 20 upon the engagement and disengagement of the plug and receptacle components. When the plug and receptacle components are not engaged, as shown on FIG. 1, the piston 26 is retained in the rightward position as shown by means of a coil spring 28 which engages an annular shoulder 30 on the piston 26. The piston 26 includes a generally circular central opening 32 having a diameter slightly larger than the diameter of the optical fiber 16, the opening 32 being axially aligned or in registry with the optical fiber 16 so that upon the reciprocal movement of the piston 26 to the left against the bias of the spring 28, as occurs during engagement of the plug and receptacle components, the clamped optical fiber 16 is exposed and extends outwardly through the piston opening 32. In this manner, the protective piston 26 also functions to help center and to provide some support for the exposed optical fiber 16.

The receptacle component 14 also comprises a generally cylindrical housing 34 adapted to receive a fiber clamping means, for example, cable clamp 36, for receiving and retaining a fiber optic cable 38 and the encompassed optical fiber 18 against axial displacement within the cylindrical housing 34. As with the plug component 12, before being inserted into the clamp 36, the optical fiber 18 is severed or cut to a precise predetermined length so as to extend a predetermined axial distance beyond the inner end of the clamp 36 and into an optical fiber guide 40 within the interior of the receptacle housing 34. The optical fiber guide 40 is comprised of an assembly of three or more glass rods fused together in side-by-side relationship and parallel to each other to form a cusp-shaped interstitial channel or fiber passageway 42 as described in the aforesaid U.S. Pat. No. 4,225,214. As shown, the ends of the fiber passageway 42 are of greater cross-sectional area than the central portion of the fiber passageway 42 in order to facilitate the entrance of optical fibers into the passageway 42. Upon engagement of the plug and receptacle components, the exposed end of the plug optical fiber 16 enters the leftmost enlarged end of the fiber passageway 42 through a generally circular central opening 43 within the receptacle housing 34 and moves along the fiber passageway 42 until it abuts with the end of the receptacle fiber 18 in a manner which is described in detail in the aforementioned U.S. Pat. No. 4,225,214. Thus, the fiber passageway 42 provides a fiber alignment or guide means for axially aligning or registering the ends of the abutting optical fibers 16 and 18 in order to provide the desired abutting end-to-end relationship without significant light signal losses.

FIG. 2 is an enlarged sectional view of the mating ends of the plug component 12 and the receptacle component 14 of FIG. 1. Referring now to FIG. 2, it can be seen that the plug component 12 further includes an elastomeric sealing membrane 44 covering the rightmost or mating end of the protective piston 26. The purpose of the sealing membrane 44 is to generally enclose the interior of the plug component 12 and, more specifically, to enclose the interior of the protective piston 26 to prevent encompassed optical fiber 16 from being subjected to contamination from particles of dirt, dust and the like while the plug and receptacle components (12 and 14) are not connected together, as shown. As discussed above, such contamination of the optical fiber 16 may result in the introduction of undesirable light signal losses into the optical system.

The mating end of the protective piston 26 has an annular flange portion 46 having an outer diameter slightly less than that of the remainder of the protective piston 26. The transition between the annular flange portion 46 and the remainder of the protective piston 26 includes an inwardly beveled portion 48 which terminates in a sharp shoulder portion 50. The elastomeric sealing membrane 44 is formed to complement the outer contour of the annular flange portion 46, beveled portion 48 and sharp shoulder portion 50, the complementary contoured portions of the sealing membrane 44 being of slightly smaller respective diameters than the corresponding protective piston portions so that the sealing membrane may be initially stretched to fit over the end of the protective piston and, when relaxed, will fit tightly over the mating end of the protective piston to thereby retain the sealing member 44 in the position as shown. It should be understood, however, that there are other suitable methods for attaching the sealing membrane 44 to the piston 26, for example by employing a suitable clamping device around the outside of the membrane 44 and piston 26, or by employing a suitable adhesive such as glue or epoxy. Of course, the outer diameter of the sealing membrane 44 must not be substantially greater than the outer diameter of the remainder of the protective piston 26 in order to insure the continued freedom for reciprocal movement of the protective piston 26 within the plug housing 20 as described above.

The receptacle component 14 includes a second elastomeric sealing membrane 52 over the leftmost or mating end thereof for enclosing the interior of the receptacle housing 34 and, more specifically, to prevent particles of dust, dirt and the like from entering the fiber passageway 42 and contaminating the optical fiber 18. The elastomeric sealing membrane 52 may be retained in place on the mating end of the receptacle housing 34 in the same manner in which the sealing membrane 44 is retained in place upon the end of the protective piston 26.

The outwardly facing suface of the plug component elastomeric sealing membrane 44 includes a pair of spaced-apart generally parallel protruding members or lugs 54. The lugs 54 are positioned equidistant from a slit 56 which extends completely through the sealing membrane 44 along a line drawn generally through the approximate center of the protective piston opening 32 and in registry with the plug optical fiber 16. For purposes which will hereinafter become apparent, a pair of openings, recesses or notches 58, as shown on FIG. 2, are disposed within the mating end face of the protective piston 26 directly behind and in proper registry with the lugs 54. The notches 58 are sized slightly greater than the lugs 54.

The outwardly facing surface of the receptacle component sealing membrane 52 also includes a pair of spaced-apart generally parallel protruding members or lugs 60. The receptacle component membrane lugs 60 register with the plug component lugs 54 when the plug and receptacle components 12 and 14, respectively, are properly aligned (as shown in FIG. 2) prior to their actually being coupled together (as shown in FIG. 3). As with the plug component 12, the receptacle housing 34 includes a pair of suitable openings, recesses or notches 62 (shown as being generally semi-circular in cross section) within the housing 34 and in registry with the lugs 60. The notches 62 are substantially the same length as the lugs 60. The receptacle sealing membrane 52 also includes a slit 64 which passes completely therethrough along a line drawn generally through the approximate center of the housing opening 43 which provides the entrance to the fiber passageway 42. The slits 56 and 64 in the sealing membranes 44 and 52, respectively, are positioned to register with each other when the plug component 12 and receptacle component 14 are properly aligned for coupling as shown.

Figure 4:
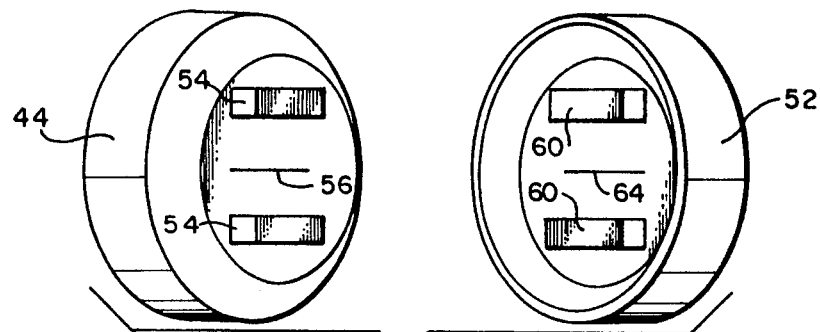
FIG. 4 is an exploded perspective view of the sealing membranes of the plug and connector components of FIG. 2 in the closed or sealing position.

As shown on FIGS. 1, 2 and 4, when the plug component 12 and the receptacle component 14 are uncoupled, the elastomeric sealing membranes 44 and 52 are in a relaxed position in which both of the slits 56 and 64 are closed. As long as the slits 56 and 64 remain closed, the sealing membranes 44 and 52 provide an effective deterrent to the entry of moisture, dirt, dust and other contaminants into the interiors of the plug and receptacle components.

Upon the engagement of the properly aligned plug and receptacle components, the protruding plug component lugs 54 initially contact the protruding receptacle component lugs 60, the lugs 54 and 60 operating as displacement means. As the plug and receptacle components are moved together for coupling, the action of the plug lugs 54 and the receptacle lugs 60 pushing upon one another tends to force the lugs and a portion of the sealing membranes into the corresponding notches 58 and 62, respectively (see FIG. 3). The displacement of the lugs 54 and 60 and sealing membrane portions into the corresponding notches 58 and 62 stretches the respective elastomeric sealing membranes 44 and 52 in a direction transverse to the slits 56 and 64, respectively, to thereby open the slits as shown on FIGS. 3 and 5. Once the respective slits 56 and 64 are open as shown, continued movement of the plug and receptacle components together results in the above-described reciprocal movement of the protective piston 26, against the bias of the spring 28. The movement of the piston 26 exposes the plug component fiber 16, for the passage of the plug component fiber 16 through the open slits 56 and 64 and into the fiber passageway 42 until it abuts the receptacle fiber 18 (not shown).

FIG. 5 shows the two slits 56 and 64 in the open position. As shown, the opening through the membrane permits a substantial amount of room for lateral fiber movement in the horizontal direction and a limited amount of room for fiber movement in the vertical direction. The purpose for the additional freedom of fiber movement in the horizontal direction is to facilitate the movement of the plug component fiber 16 through the fiber passageway 42 which on FIGS. 1-3 is actually slightly curved in a direction out of the paper (not shown). By providing additional freedom of movement in this manner, the fiber 16 may pass through the open slits 56 and 64 without actually contacting either of the sealing membranes 44 and 52.

As long as the plug component 12 and the receptacle component 14 remain coupled together as shown on FIG. 3, the slits 56 and 64, respectively, remain in the open position as shown on FIGS. 3 and 5. Upon disengagement of the plug and receptacle components, the plug component optical fiber 16 is withdrawn from the fiber passageway 42 as the protective piston 26 moves reciprocally under the action of the spring 28. Once the plug component fiber 16 has been completely withdrawn and the encompassing protective piston 26 has moved to the position as shown in FIG. 1, the plug and receptacle components are disengaged from one another, thereby relaxing the elastomeric sealing membranes 44 and 52 to afford displacement of the lugs from their respective notches and effecting closure of the slits 56 and 64, respectively (as shown on FIGS. 2 and 4).

As discussed above, opening the slits 56 and 64 just prior to the plug component fiber 16 passing therethrough is particularly important. Optical fibers of the type used in connection with the present invention have a diameter on the order of 0.005 inches or less and are relatively brittle. Thus, in order to provide a good low loss connection between the two optical fibers 16 and 18, the plug component optical fiber 16 must have an unobstructed entrance path to the fiber passageway 42 of the receptacle component 14. If the plug component fiber 16 had to pierce the elastomeric sealing membrane 44 or had to push through a closed or partially closed slit or slot in such a sealing membrane, as disclosed in the prior art electrical connectors, the small, brittle optical fiber may suffer deterioration and would perhaps become unserviceable. In addition, if a liquid or some other form of lubricant or other connection aid was applied to the optical fiber in order to improve the optical connection, the liquid or lubricant or other connection aid would be partially or completely wiped off or removed from the fiber if the fiber was made to puncture a sealing membrane or pass through a closed slot as is done in the prior art electrical connectors. By having the slits 56 and 64 open prior to the passage of the plug component optical fiber 16 therethrough, the fiber is presented with a clear, unimpeded pathway directly to the receptacle component fiber passageway 42.

Correspondingly, the slits 56 and 64 remain in the open position as shown on FIG. 3 as long as the plug and receptacle components are coupled together. By keeping the slits open in this manner, the present invention avoids putting pressure on the optical fiber 16 during the connection, thereby avoiding possible bending or other damage to or deterioration of the fiber.

Likewise, the slits 56 and 64 remain open as the plug and receptacle components are being uncoupled, again in order to provide an unimpeded path for the optical fiber 16 to prevent any possibility of degradation of the fiber and the optical connection due to the sealing system.

It will, of course, be appreciated by those skilled in the art that there are many possible variations and changes that may be made to the above-described connector assembly which will still provide the desired results. One such variation is shown on FIGS. 6 and 7 wherein only the elastomeric sealing membranes are shown, it being understood that the remainder of the connector assembly is substantially the same as that shown in FIGS. 1-3.

Figure 6:
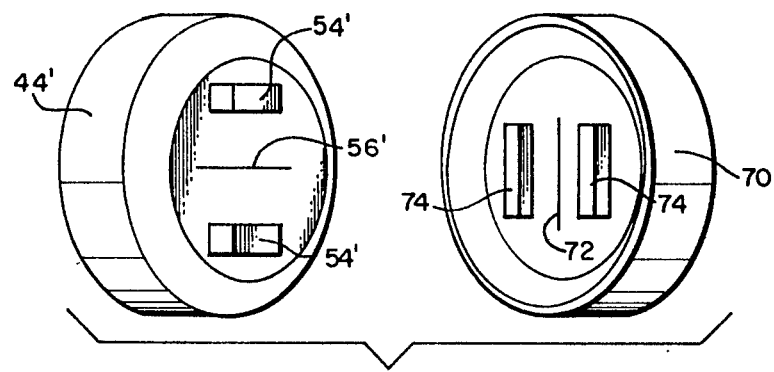
FIG. 6 is a view similar to FIG. 4 but with a slight modification made to the orientation of one of the sealing membranes.

Referring to FIG. 6, it can be seen that the receptacle component elastomeric sealing membrane 70 has been rotated 90° from the elastomeric sealing membrane 52 as shown on FIGS. 1-4. Thus, the slit 72 and the lugs 74 are correspondingly vertically oriented as shown. Suitable openings or notches (not shown) are correspondingly disposed in the receptacle housing (not shown) directly behind and substantially parallel to the lugs 74. The plug component elastomeric sealing membrane 44' is exactly as described above in connection with FIGS. 1-4, the corresponding parts being designated with the same reference numerals with the addition of primes thereto.

As shown on FIG. 6, when the plug and receptacle components are uncoupled, the elastomeric sealing membranes 44' and 70 are in a relaxed position in which both of the slits 56' and 72 are closed to protect the interiors of the respective components from contamination. Upon the engagement of the plug and receptacle components, the lugs 54' of the plug component sealing membrane contact or engage the outer surface of the receptacle component sealing membrane 70 and the lugs 74 on the receptacle component sealing membrane 70 contact the outer surface of the plug component sealing membrane 44'. The action of pushing the components together tends to force the lugs 54' and 74 into the corresponding notches (not shown), thereby displacing and stretching the respective elastomeric sealing membranes 44' and 70 in a direction transverse to the slits 56' and 72 in the manner described above with respect to FIGS. 1–5. Once the respective slits 56' and 72 are open, continued movement of the plug and receptacle components toward each other results in the reciprocal movement of the protective piston, and the passage of the plug component fiber through the open slits.

Figure 7:
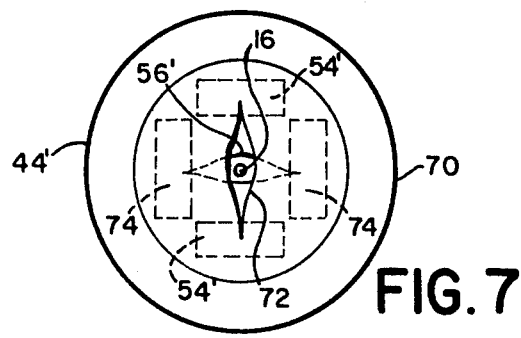
FIG. 7 is a view similar to FIG. 5 showing the slightly modified sealing membranes as shown in FIG. 6 in the open position.

FIG. 7 shows the slits 56' and 72 displaced into the open position. From FIG. 7, it can be seen that the size and shape of the opening through which the fiber may pass is somewhat different than the size and shape of the opening afforded by the connector shown in FIG. 5. Thus, the connector as shown on FIGS. 6 and 7 should be employed only when the connecting fibers are small or do not otherwise require the additional lateral clearance.

Referring to FIGS. 8–11, there are shown two variations of a first alternate embodiment of the above-described connector assembly which still provides the desired results. The first variation, shown in FIGS. 8 and 9, comprises plug and receptacle components 80 and 82, respectively, having their respective mating ends covered by elastomeric sealing membranes 84 and 86. The elastomeric sealing membranes 84 and 86 may be attached to the plug and receptacle components 80 and 82 in the manner as described in detail above or in any other suitable manner. Correspondingly, aligned or registered slits 88 and 90 are located on the respective sealing membranes 84 and 86, the slits in the present instance passing on a line passing generally through the center of the plug and receptacle components in a manner as discussed above.

It should be noted that connector components 80 and 82 are not necessarily the same connector components as was described above in connection with FIGS. 1–3. However, the components 80 and 82 are substantially similar to those described above.

The elastomeric sealing membranes 84 and 86 each include a pair of substantially parallel lugs 92 and 94 positioned on opposite sides of the slits 88 and 90 around the circumference of the mating ends of the plug and receptacle components. The lugs 92 and 94 are also substantially parallel to the slits 88 and 90 so that the first pair of lugs 92 is aligned or in registry with the second pair of lugs 94 when the plug and receptacle components are to be coupled together.

Figure 9:
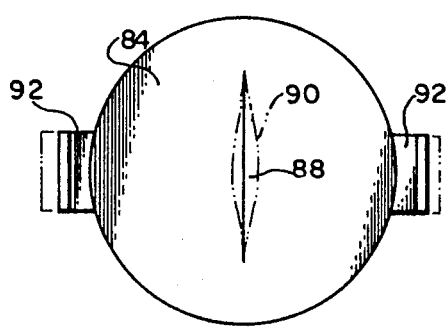
FIG. 9 is a view similar to FIG. 5 showing the sealing membranes of the embodiment of FIG. 8 in the open position.

When the plug and receptacle components are moved together for coupling, the aligned, registered pairs of lugs 92 and 94 push upon one another, thereby displacing and stretching the elastomeric sealing membranes 84 and 86 transverse to the slits 88 and 90 to thereby open the slits as shown on FIG. 9. As with the above-described embodiments, once the respective slits 88 and 90 are open, continued movement of the plug and receptacle components together results in the passage of a fiber located within the plug component (not shown) through the open slits and into engagement with a corresponding fiber within the receptacle component (not shown). Also, as with the above-described connector assembly of FIGS. 1–4, the slits 88 and 90 remain in the open position as long as the plug and receptacle components are coupled together and during the uncoupling of the components until such time as the plug component fiber (not shown) has been withdrawn from the receptacle component.

Figure 8:
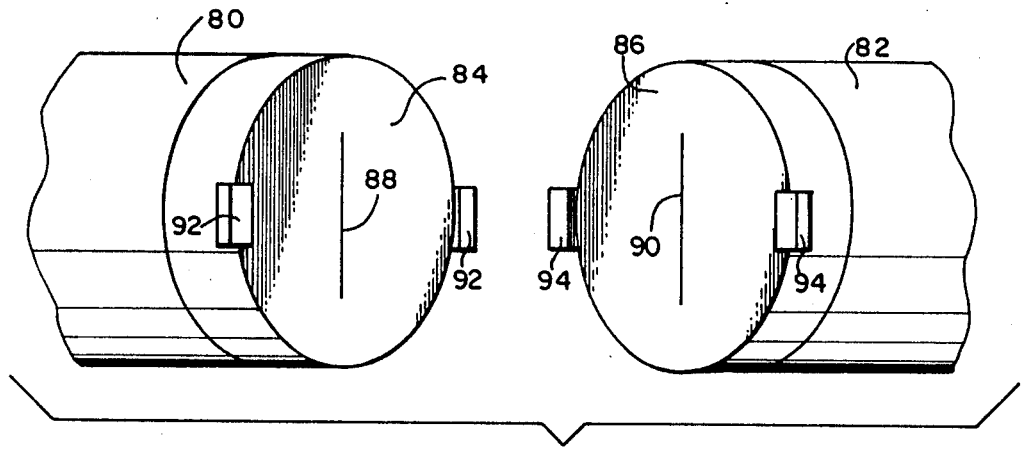
FIG. 8 is a view similar to FIG. 4 showing a first alternate embodiment of the sealing membrane of the present invention.
Figure 11:
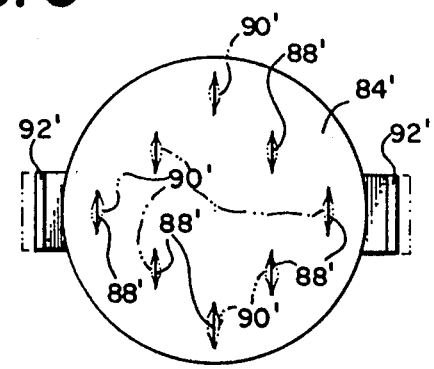
FIG. 11 is a view similar to FIG. 5 showing the multiple slits variation of FIG. 10 with the slits in the open position.
Figure 10:
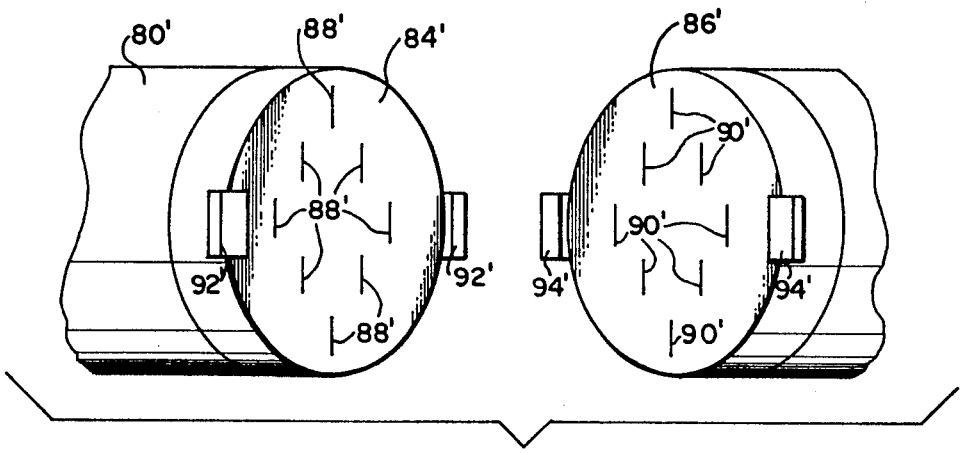
FIG. 10 is a view similar to FIG. 4 showing a variation of the first alternate embodiment of the present invention wherein the sealing membranes include multiple slits.

FIGS. 10 and 11 show a slight variation of the connector components of FIGS. 8 and 9, the same parts being identified utilizing the same reference numerals but with the additions of primes thereto. Referring to FIG. 10, it can be seen that the connector components 80' and 82' are essentially the same as components 80 and 82 of FIG. 8 except that instead of having a single slit in each component, each component includes an equal plurality of slits 88' and 90' which register with one another, eight such slits being shown. The structure and operation of the components of FIG. 10 is the same as that of FIG. 8. FIG. 11 shows the multiple slit connector assembly of FIG. 10 with the membranes displaced to dispose slits 88' and 90' in the open position.

Figure 12:
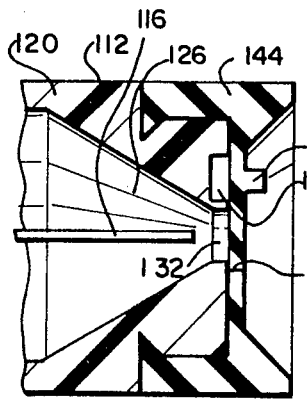
FIG. 12 is an enlarged sectional view of a portion of the plug component of a connector constructed in accordance with a second alternate embodiment of the present invention in which the slit in the sealing membrane is initially offset from or out of registry with the optical fiber.
Figure 13:
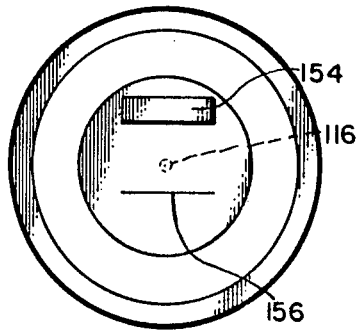
FIG. 13 is an end elevation view of the connector of FIG. 12.
Figure 14:
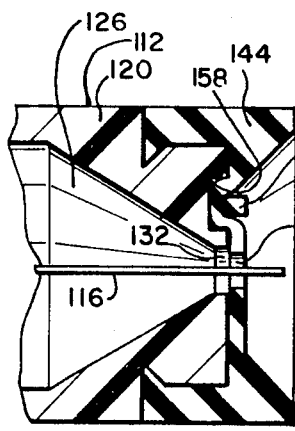
FIG. 14 is a view similar to that of FIG. 12 showing the sealing membrane slit in the open position, as in its coupled position.

FIGS. 12–20 show various configurations of a second alternate embodiment of the present invention. In the embodiment shown in FIGS. 12–14, the connector assembly includes a plug component 112 and a receptacle component (not shown), each of which are structurally and operationally the same as those of the connector assembly 10 as shown in FIGS. 1–3 with a few minor variations which will be described below. In order to avoid confusion and to aid the reader, the receptacle component is not shown on FIGS. 12–14, it being understood that the receptacle component is substantially the same as receptacle component 14 of FIGS. 1–3 with the exception of the variations described below in connection with the plug component 112. To further aid the reader, the various corresponding parts of the plug component 112 as shown in FIGS. 12–14 will be identified by reference numerals corresponding to the reference numerals used in connection with the plug component 12 of FIGS. 1–3 but with the addition of the prefix "1", thereby employing the same number plus 100.

Referring now to FIG. 12, there is shown the plug component 112 having a generally cylindrical housing 120 encompassing an optical fiber 116 which is held in place therein by a clamp (not shown). The plug component 112 further includes a reciprocally movable protective piston 126 having a generally circular central opening 132 with a diameter slightly larger than the diameter of the optical fiber 116. The mating end of the plug component 112 further includes an elastomeric sealing membrane 144 for generally enclosing the interior of the housing 120 to prevent the optical fiber 116 from being subjected to contamination. As shown, the elastomeric sealing membrane 144 is attached to the plug component housing 120 in the same manner as described above in connection with elastomeric sealing membrane 44 of FIG. 2. However, it should be understood that the elastomeric sealing membrane 144 may be attached to the plug component housing 120 in any other suitable manner.

As shown on FIGS. 12 and 13, the outwardly facing surface of the sealing membrane 144 includes a single protruding member or lug 154 positioned near the outer circumference of the sealing membrane surface. A suitable opening, recess or notch 158, as shown on FIG. 12, is disposed within the mating end face of the protective piston 126 directly behind and in registry with the lug 154. A slit 156 extends completely through the sealing member along a line parallel to the lug 154. As shown on FIGS. 12 and 13, the slit 156 is not registered with the protective piston opening 132. Instead, the slit 156 is disposed offset on one side out of registry with the protective piston opening 132 and the lug 154 is disposed on the other side of the protective piston opening 132. The lug 154 and the slit 156 are, in this embodiment, positioned about equidistant from the protective piston opening 132. Of course, the receptacle component (not shown) has a similarly positioned lug and slit arrangement.

Figure 15:
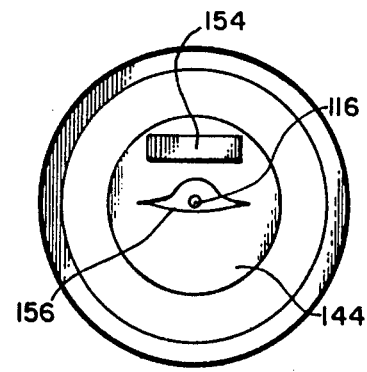
FIG. 15 is an end elevation view of the connector of FIG. 14.

FIGS. 14 and 15 show the plug component of FIG. 12 with the membranes 144 displaced to dispose the slit 156 in the open position. As shown on FIG. 14, when the plug component 112 engages the receptacle component (not shown), the lug 154 is displaced into the notch 158 as shown. The action of pushing the lug 154 into the notch 158 displaces and stretches the elastomeric sealing membrane 144 to both open the slit 156 and move the slit laterally toward the lug 154 to a position in which the open slit 156 is in registry with the piston opening 132. The opening and lateral movement of the slit 156 results in a clear path for the optical fiber 116 to pass through the sealing membrane and enter the receptacle component (not shown).

Figure 16:
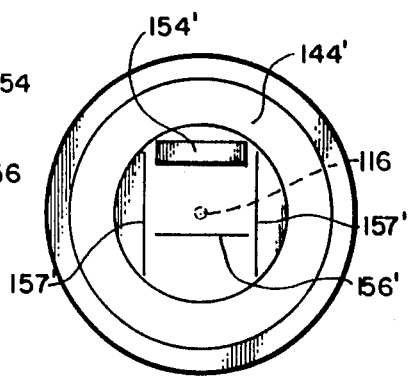
FIG. 16 is a view similar to FIG. 13 but showing a variation of the embodiment of FIG. 13.
Figure 17:
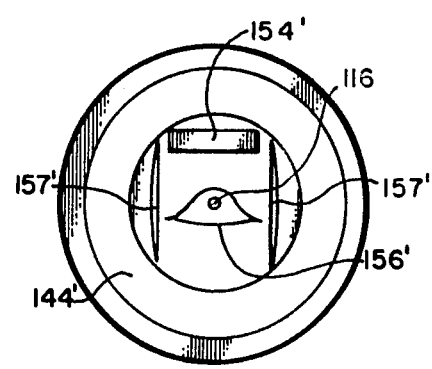
FIG. 17 is a view similar to FIG. 15, showing the slit in the sealing membrane of the variation of FIG. 16 in the open position.

FIGS. 16 and 17 show a slight modification to the embodiment described in connection with FIGS. 12-14. On FIGS. 16 and 17, the same parts are designated with the same reference numerals as was used in connection with FIGS. 12-14 but with the addition of primes thereto.

In FIG. 16 it can be seen that the elastomeric sealing membrane 144' includes a lug 154' and slit 156' located and oriented in substantially the same manner as was done in connection with the lug 154 and slit 156 of FIGS. 12-14. However, the sealing membrane 144' of FIGS. 16 and 17 also includes a pair of substantially parallel spaced-apart score lines, in the present embodiment, full slits 157'. The slits 157' are substantially normal to the lug 154' and the slit 156' and extend between and beyond the lug 154' and the slit 156' to isolate these components of the membrane from the perimeter where the membrane is attached to the plug component housing 120, to permit greater freedom for displacement. The primary purpose of the additional score lines 157' is to facilitate the displacement and opening of the slit 156' in the manner as shown on FIG. 17.

Figure 18:
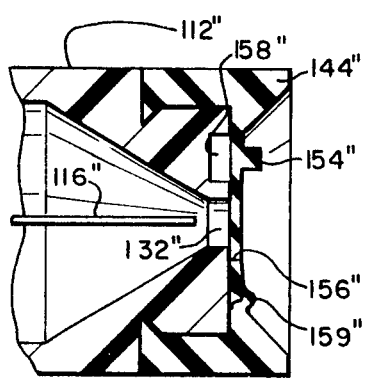
FIG. 18 is a view similar to FIG. 12 showing a variation of the embodiment of FIG. 12 in which the slit in the sealing membrane is initially offset from or out of registry with the connector opening.
Figure 19:
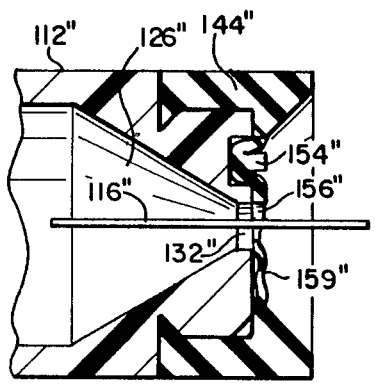
FIG. 19 is a view similar to FIG. 14 showing the variation of FIG. 18 with the sealing membrane slit in the open position.

FIGS. 18 and 19 show another variation of the plug component of FIGS. 12-14. The plug component of FIGS. 18 and 19 is substantially the same as the plug component of FIGS. 12-14 with the exception of some minor changes in the structure of the elastomeric sealing membrane. Accordingly, the corresponding parts will be given corresponding reference numerals with the addition of double primes thereto.

Referring to FIG. 18, there is shown the plug component having an elastomeric sealing membrane 144" which includes a single lug 154" and a single slit 156" which is offset from the piston opening as described above. A suitable recess or notch 158" is disposed within the mating surface of the protective piston 126" directly behind and in registry with the lug 154". The elastomeric sealing membrane 144" further includes additional elastomeric material in the form of an accordion pleat portion 159". The purpose of the accordion pleat portion 159" is to provide greater freedom for displacement and to facilitate the opening and movement of the slit 156" upon engagement of the plug component 112" with the receptacle component (not shown) as shown on FIG. 19. In this manner, the slit 156" is suitably opened and in registry with the piston opening 132" to facilitate movement of the optical fiber 116" therethrough.

Figure 20:
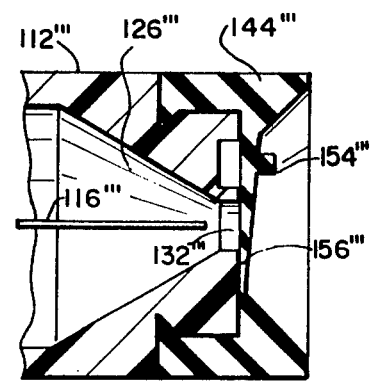
FIG. 20 is a view similar to FIG. 12 but showing another variation of the embodiment of FIG. 12 with the sealing membrane slit in a position offset from or out of registry with the optical fiber opening.

FIG. 20 shows yet another variation of the plug component described in connection with FIGS. 12-14. Again, corresponding components will be identified with corresponding reference numerals but with the addition of triple primes thereto.

Referring to FIG. 20, the elastomeric sealing membrane 144''' includes a single lug 154''' and a single slit 156''' disposed offset from the piston opening as discussed above in connection with FIGS. 12-14. A suitable recess or notch 158''' is disposed within the mating surface of the protective piston 126''' directly behind and suitably registered with the lug 154'''. As shown, the thickness of the sealing membrane 144''' is greater at and around the lug 154''' and tapers downwardly to its thinnest just below the slit 156'''. The purpose of the tapered thickness in the sealing membrane 144''' is to provide greater freedom for displacement and facilitate the opening and translation of the slit 156''' upon engagement of the plug component 112''' with the receptacle component (not shown). In this manner, the slit 156''' is suitably opened and in registry with the piston opening 132''' to facilitate movement of the optical fiber 116''' therethrough.

Figure 21:
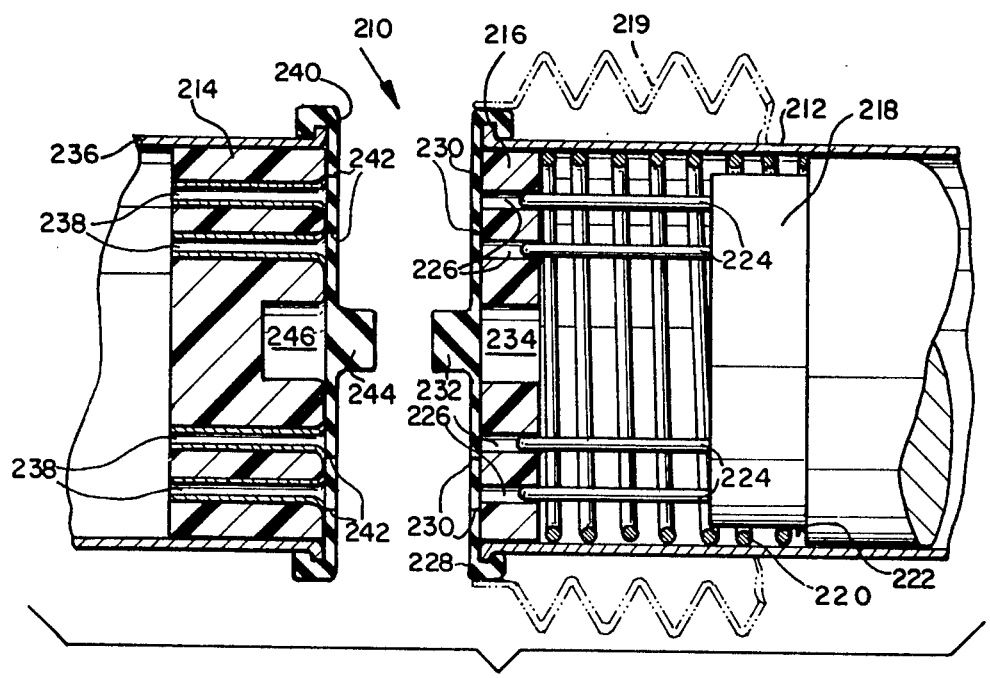
FIG. 21 is an enlarged sectional view of the uncoupled plug and receptacle components of a third alternate embodiment of the present invention just prior to coupling.
Figure 22:
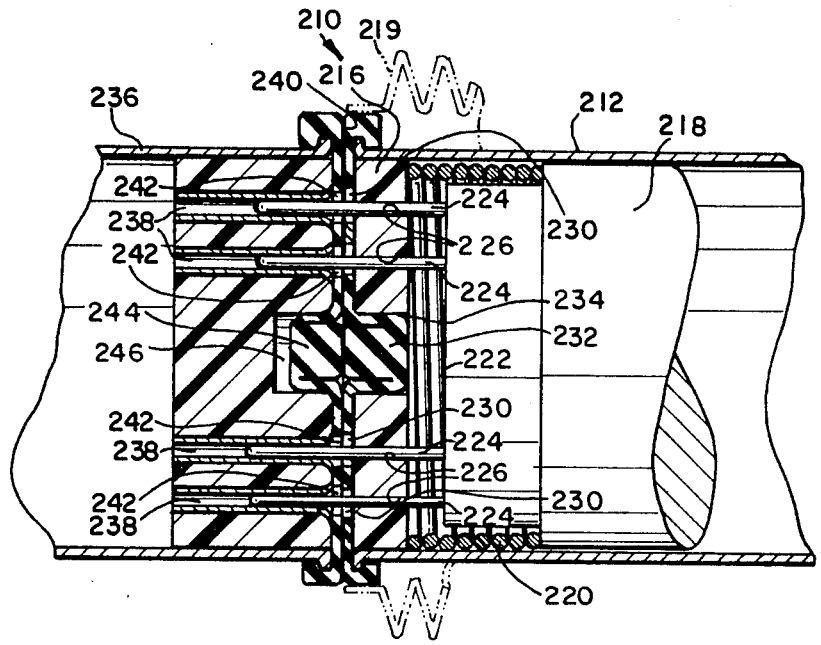
FIG. 22 is an enlarged sectional view of the plug and receptacle components of FIG. 21 in the assembled or coupled position.

Referring now to FIGS. 21 and 22, there is shown a third alternate embodiment of the present invention comprising a connector assembly or connector 210 for making an electrical connection. As shown, the connector 210 comprises a multiple pin connector assembly (only four pins being shown) for making a plurality of electrical connections simultaneously. It should be understood, however, that the present invention is not limited to such a multiple pin electrical connector assembly, but is equally applicable to a single pin electrical connector.

The connector 210 includes a plug component 212 and a receptacle component 214 as shown. The plug component comprises a generally cylindrical piston member 216 reciprocally movable within a housing 218 (only a portion of the housing 218 being shown). When the plug and receptacle components are not engaged, as shown in FIG. 21, the piston member 216 is retained in the leftward position as shown by means of a coil spring 220 which engages both the piston member 216 and an annular shoulder 222 in the housing 218. A plurality of conductor means or conductor pins 224 are attached to the housing 218 and extend outwardly therefrom into a similar plurality of generally circular openings 266 in the piston member 216. The piston openings 226 have a diameter slightly greater than the outer diameter of the pins 224 so that the generally fixed pins 224 move freely through the circular piston member openings 226 upon the reciprocal movement of the piston member 216 to the right against the bias of the spring 220. A sealing diaphragm 219 may also be included to encompass the piston member 216. The pins 224 may be attached to suitable electrical wires (not shown).

The plug component 212 further includes an elastomeric sealing membrane 228 covering the leftmost or mating end of the piston member 216. The purpose of the sealing membrane is to enclose the interior of the piston member 216 in the manner as discussed with respect to the foregoing embodiments. The sealing membrane 228 may be correspondingly attached to the piston member 216 in the manner as described with respect to the sealing membrane 44 of FIG. 2 or in any other suitable manner. The sealing membrane 228 includes a plurality of slits 230 which extend therethrough as shown. The slits 230 in the present embodiment are shown as being offset or not in registry with the piston member openings 226. However, it should be understood that the slits 230 could be positioned in registry with the piston member openings 226.

The outwardly facing surface of the plug component elastomeric sealing membrane 228 includes a protruding member or lug 232. A recess or notch 234 is disposed within the mating end face of the piston member 216 directly behind and in proper registry with the lug 232. The recess 234 is sized slightly greater than the lug 232.

The plug component 214 comprises a generally cylindrical housing 236 which includes a plurality of conductor receiving means or contacts 238. The contacts 238 are generally hollow and have an inner diameter slightly smaller than the outer diameter of the pins 224 so that when the plug and receptacle components are suitably connected together, a tight fit is afforded between the pins 224 and the contacts 238, thereby providing a good electrical connection. The number of contacts 238 is equivalent to the number of pins 224 (only four contacts being shown) and the contacts 238 are arranged within the plug housing 236 so as to be in registry with the pins 224 when the plug component 212 and receptacle component 214 are suitably aligned for connection as shown in FIG. 21. The plug component further includes an elastomeric sealing membrane 240 positioned over the rightmost or mating end thereof for enclosing the interior of the receptacle housing and, more specifically, to prevent particles of dust, dirt and the like from entering the contacts 238. The elastomeric sealing membrane 240 may be retained in place on the mating end of the receptacle housing 236 in the same manner in which the sealing membrane 228 is retained in place upon the end of the piston member 216.

The receptacle components sealing membrane 240 includes a plurality of slits 242, the slits being offset or not in registry with the contacts 238. The outwardly facing surface of the receptacle component sealing member 240 also includes a protruding member or lug 244. The lug 244 generally is in registry with the plug component lug 232 when the plug and receptacle components are properly aligned (as shown in FIG. 21) prior to their actually being coupled together (as shown in FIG. 22). As with the plug component 212, the receptacle housing 236 includes a suitable recess or notch 246 behind the sealing membrane 240 and in registry with the lug 244.

As shown in FIG. 21, when the plug and receptacle components are uncoupled, the elastomeric sealing membranes 228 and 240 are in a relaxed position in which all of the slits 230 and 242 are closed. As long as the slits 230 and 242 remain closed, the sealing membranes 228 and 240 provide an effective deterrent to the entry of moisture, dirt, dust and other contaminants into the interiors of the plug and receptacle components.

Upon the engagement of the properly aligned plug and receptacle components, the protruding lugs 232 and 244 initially contact each other and operate as displacement means. As the plug and receptacle components are moved together for coupling, the action of the lugs 232 anad 244 pushing against one another tends to force the lugs and a portion of the respective sealing membrane into the corresponding notches 234 and 246, respectively (see FIG. 22). The displacement of the lugs 232 and 244 and sealing membrane portions into the corresponding notches 234 and 246 stretches the respective elastomeric sealing membranes 228 and 240 to both open the slits 230 and 242 and to move the slits 230 and 242 laterally towards the lugs 232 and 244 to a position in which the open slits 230 and 242 are in registry with the piston member openings 226 and the contacts 238 as shown. The opening and lateral movement of the slits results in a clear path for the pins 224 to pass through both of the sealing membranes 228 and 240 upon movement of the piston member 216 and to make a proper electrical connection with the contacts 238 as shown in FIG. 22.

The slits 230 and 242 remain in the open position as shown in FIG. 22 as long as the plug and receptacle components are coupled together. By keeping the slits open in this manner, the present invention avoids putting pressure on the pins 224 during the connection, thereby providing possible bending or other damage or deterioration of the pins. Upon disengagement of the plug and receptacle components, the pins 224 are withdrawn from the contacts 238 as the piston member 216 moves reciprocally under the action of the spring 220. Once the pins have been completely withdrawn and the piston member has moved to the position as shown in FIG. 21, the plug and receptacle components are disengaged from one another, thereby relaxing the elastomeric sealing membranes 228 and 240 to afford displacement of the lugs 232 and 244 from their respective notches and effecting closure of the slits 230 and 242 as shown in FIG. 21.

From the foregoing description, it can be seen that the present invention comprises a connector assembly which is particularly suitable for fiber optical connections and which overcomes the deficiencies of the prior art diaphragm-sealed connector assemblies. It will be recognized by those skilled in the art that changes may be made to the above-described embodiments of the invention without departing from the broad inventive concepts thereof. Several examples of such modifications or changes are described above. It is understood, therefore, that this invention is not limited to the particular embodiments and variations disclosed, but it is intended to cover all modifications which are within the scope and spirit of the invention as defined by the appended claims.

We claim:

1. A connector for connecting the ends of two optical fibers comprising:

a plug component for matingly engaging with a receptacle component, the plug component having a first means for receiving and retaining a first optical fiber therein and a first elastomeric sealing membrane covering the mating end thereof for enclosing the interior of the plug component, the first sealing membrane having a slit therein;

a receptacle component having a second means for receiving and retaining a second optical fiber therein and a second elastomeric sealing membrane over the mating end thereof for enclosing the interior thereof, the second sealing membrane having a slit therein, said slits in the first and second sealing membranes positioned to register upon mating engagement of said components; and displacement means operable upon the engagement of the plug and receptacle components to stretch the first and second sealing membranes in a direction transverse to said slits to open the slits for the passage of the first fiber therethrough and into engagement with the second fiber and operable upon disengagement of the plug and receptacle components and withdrawal of said first fiber from engagement with the second fiber, to relax the first and second sealing membranes to close the slits.

2. The connector as recited in claim 1 wherein the slits are in registry with the respective optical fibers when the plug and receptacle components are not matingly engaged.

3. The connector as recited in claim 2 wherein the displacement means comprises a first pair of lugs on the first elastomeric sealing membrane and a second pair of lugs on the second elastomeric sealing membrane, said first and second pairs of lugs being positioned to register upon mating engagement of said components.

4. The connector as recited in claim 3 further including first and second pairs of recesses disposed within the plug and receptacle components adjacent the first and second pairs of lugs, said first and second pairs of lugs being adapted to displace at least a portion of said sealing membranes into said first and second pairs of recesses upon mating engagement of said components.

5. The connector as recited in claim 4 wherein the first and second pairs of lugs are disposed upon the first and second elastomeric sealing membranes on the outwardly-facing surfaces thereof.

6. The connector as recited in claim 1 wherein the slits in the first and second sealing membranes are offset from the first and second optical fibers when the plug and receptacle components are not matingly engaged.

7. The connector as recited in claim 6 wherein the displacement means comprises first and second lugs disposed upon the first and second sealing membranes, said lugs being in registry with each other upon mating engagement of the plug and receptacle components.

8. The connector as recited in claim 7 wherein the plug and receptacle components further comprise first and second recess means disposed adjacent the first and second lugs, said recesses and first and second lugs being adapted to displace at least a portion of said first and second elastomeric sealing membranes into said first and second recesses upon mating engagement of the plug and receptacle components.

9. The connector as recited in claims 3 or 8 further including first and second pairs of score lines within the first and second sealing membranes respectively, to facilitate the stretching of the first and second sealing membranes to open the slits.

10. The connector as recited in claim 9 wherein the first and second pairs of score lines are perpendicular to the lugs.

11. The connector as recited in claims 1 or 8 wherein the first and second sealing membranes further include at least one accordion pleat portion to facilitate the stretching of the first and second sealing membranes to open the slits.

12. The connector assembly as recited in claims 1 or 8 wherein the thickness of the first and second sealing membranes is varied to facilitate the stretching of the first and second sealing membranes to open the slits.

13. The connector as recited in claim 1 and further including a first optical fiber in the interior of said plug component, retained within and projecting from said first means of the plug component, and a second optical fiber in the interior of said receptacle component, retained within and projecting from said second means of the receptacle component, the respective ends of said fibers upon engagement of said components being in registry and in endwise engagement with each other through said slits, and upon disengagement of said components being withdrawn from and confronting said membranes.

14. A connector for interconnecting two conductors comprising:
  a plug component for matingly engaging with a receptacle component, the plug component having conductor means therein and a first elastomeric sealing membrane covering the mating end of said component to seal the same, the first sealing membrane having a slit therein;
  a receptacle component having conductor receiving means therein and having a second elastomeric sealing membrane covering the mating end of the receptacle component to seal the same, the second sealing membrane having a slit therein, said slits in the first and second sealing membranes positioned to register upon mating engagement of said components; and
  displacement means operable upon the mating engagement of said components to stretch the first and second sealing membranes in a direction transverse to the slits to open the slits to permit the passage of the conductor means therethrough for engagement of the conductor receiving means during engagement and disengagement of said components, said displacement means operable upon disengagement of said components to relax the first and second sealing membranes to close the slits.

15. The connector as recited in claim 14 wherein the slits are in registry with the conductor means and the conductor receiving means when the plug and receptacle components are not matingly engaged.

16. The connector as recited in claim 15 wherein the displacement means comprises a first pair of lugs on the first elastomeric sealing membrane and a second pair of lugs on the second elastomeric sealing membrane, said first and second pairs of lugs being positioned to register upon mating engagement of said components.

17. The connector as recited in claim 14 wherein the slits in the first and second sealing membranes are offset from the conductor means and the conductor receiving means when the plug and receptacle components are not matingly engaged.

18. The connector assembly as recited in claim 17 wherein the displacement means comprises first and second lugs disposed upon the first and second sealing membranes, said lugs being in registry with each other upon mating engagement of the plug and receptacle components.

19. For a connector assembly having a plug component with conductor means therein and a receptacle component with conductor-receiving means therein, said components being adapted for mating engagement and disengagement, an elastomeric sealing membrane covering the mating end of at least one of said components for enclosing the same, said sealing membrane having a slit therein and having means cooperating with displacement means on the other of said components operable upon mating engagement of said components to stretch said sealing membrane in a direction transverse to said slit to open said slit to permit the passage of the conductor means therethrough during engagement and disengagement of said components, said cooperating means operable upon disengagement of said components to relax the sealing membrane to close the slit.

20. A receptacle component having conductor-receiving means therein and in combination therewith an elastomeric sealing membrane as recited in claim 19 positioned to align said slit with said conductor-receiving means when in the open position.

21. A receptacle according to claim 20 including an optical fiber mounted in said conductor-receiving means with its end confronting said membrane.

22. A plug component having conductor-receiving means therein and in combination therewith an elastomeric sealing membrane as recited in claim 19 positioned to align said slit with said conductor-receiving means when in the open position.

23. A plug according to claim 22 including an optical fiber mounted in said conductor-receiving means with its end confronting said membrane.

* * * * *